Mar. 5, 1929.  K. K. A. THORSEN  1,703,970
RETREADING MOLD
Original Filed June 14, 1926  2 Sheets-Sheet 1

INVENTOR
K.K.A.Thorsen
BY
ATTORNEY

Mar. 5, 1929.　　　K. K. A. THORSEN　　　1,703,970
RETREADING MOLD
Original Filed June 14, 1926　　2 Sheets-Sheet 2

INVENTOR
K. K. A. Thorsen
BY
ATTORNEY

Patented Mar. 5, 1929.

1,703,970

UNITED STATES PATENT OFFICE.

KARL K. A. THORSEN, OF SAN FRANCISCO, CALIFORNIA.

RETREADING MOLD.

Application filed June 14, 1926, Serial No. 115,758. Renewed October 20, 1928.

This invention relates to improvements in vulcanizing machines, particularly machines for retreading pneumatic tire casings.

One of the purposes of the invention is to do away with the objectionable bead rings now commonly used in vulcanizing machines. These rings often become heated to the extent that they damage the beads and sides of the casing and for this reason are objectionable. The present invention provides a novel and efficacious form of support for an air bag to be contained within the casing, which support insures the holding of the air bag in proper position to properly distend the casing and in addition causes the sides and bead portions of the tire to be disposed in proper position without subjecting such portions to the damaging effect of the curing heat.

Another object of the invention is to provide a vulcanizing machine of the character described which applies the curing heat to the tread portion only and not to the sides and beads of the tire and which in one operation will cure the entire tread.

Another object of the invention is to provide a vulcanizing machine which will be simple and inexpensive as to construction and reliable and inexpensive as to operation.

Another object of the invention is to provide a novel form of clamping means for holding the sectional vulcanizing chamber in proper position and for clamping the air bag within the tire, this said means providing for varying the pressure on the air bag to insure the holding of the tire in properly distended position during the vulcanizing operation.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings.

Figures 1, 2:
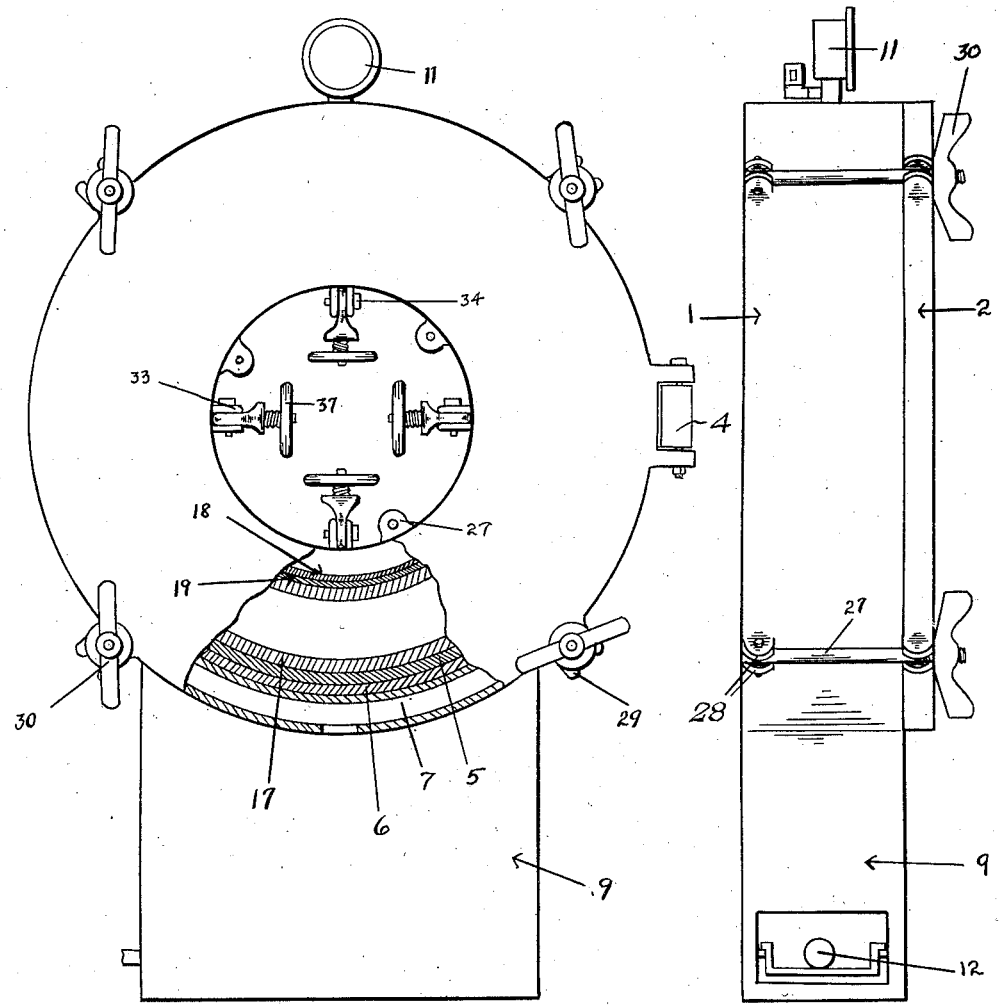
Fig. 1 represents a front elevation of the vulcanizing machine of my invention.
Fig. 2 represents a side elevation of the machine.

The embodiment of the invention shown in the accompanying drawings comprises an annular vulcanizing shell made up of a stationary section 1 and a hinged section 2 which has a flange 3 adapted to telescope within the section 1, said section 2 being hinged as at 4 to the side of the section 1. These two sections are shaped to provide an annular chamber which is circular in cross section and adapted to receive an annular matrix 5 which will contain the tire casing to be vulcanized as shown at 6. The section 1 is formed with an annular steam chamber 7 which is rectangular in cross section and of such shape and arrangement as to apply the heat directly to the tread of the tire instead of to the sides thereof. The lower side of this chamber communicates with a boiler chamber 8 formed in the base member 9 of the machine. Water is delivered to the chamber through a suitable feed pipe having connection with a source of water supply, not shown. On top of the machine in communication with the steam jacket is a steam gage 11. Beneath the boiler chamber is a suitable burner 12 for heating the water to generate the steam.

The matrix 5 is formed in two sections hinged together as at 13 at certain ends and provided with a lap joint fastening means generally designated 14 at their other ends. The two sections 1 and 2 of the vulcanizing chamber when closed, provide for a snug fit of the matrix therein. The outer side of the flange 3 is beveled and engages a beveled face 15 on the section 1 of the vulcanizing chamber. The outer edge of the flange abuts a shoulder 16 on the section 1. This provides for a snug fitting of the two sections together and the proper clamping of the matrix in the vulcanizing chamber so as to insure an effective transmission of heat in the curing operation.

An air bag or tube 17 of a one piece circular form like the ordinary inner tube, is adapted to be placed within the tire casing 6, in order to hold the walls of the casing distended and in proper position for the vulcanizing operation. This air bag is held in position by means of a sectional ring-like holder made up of two split-ring sections designated 18 and 19, which sections are inserted into the casing so as to properly support the air bag and to hold the lower edges or sides of the casing in proper position.

Figure 3:
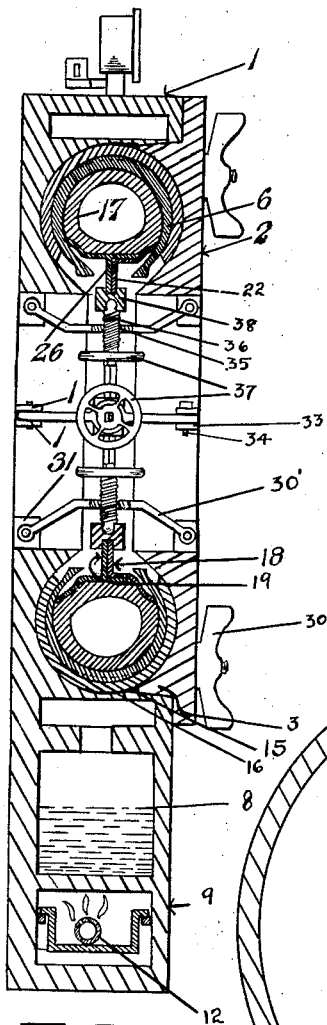
Fig. 3 represents a vertical sectional view of the machine.
Figure 4:
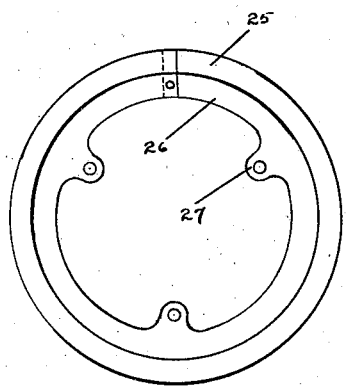
Fig. 4 represents a side elevation of the tire casing showing the air bag supporting means therein.
Figure 5:
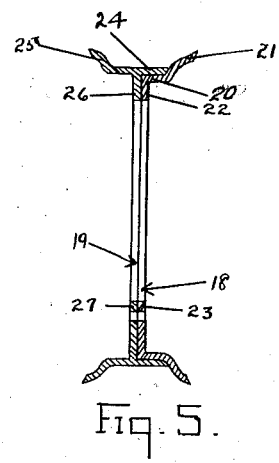
Fig. 5 represents a vertical sectional view of the air bag support.
Figures 6, 7:
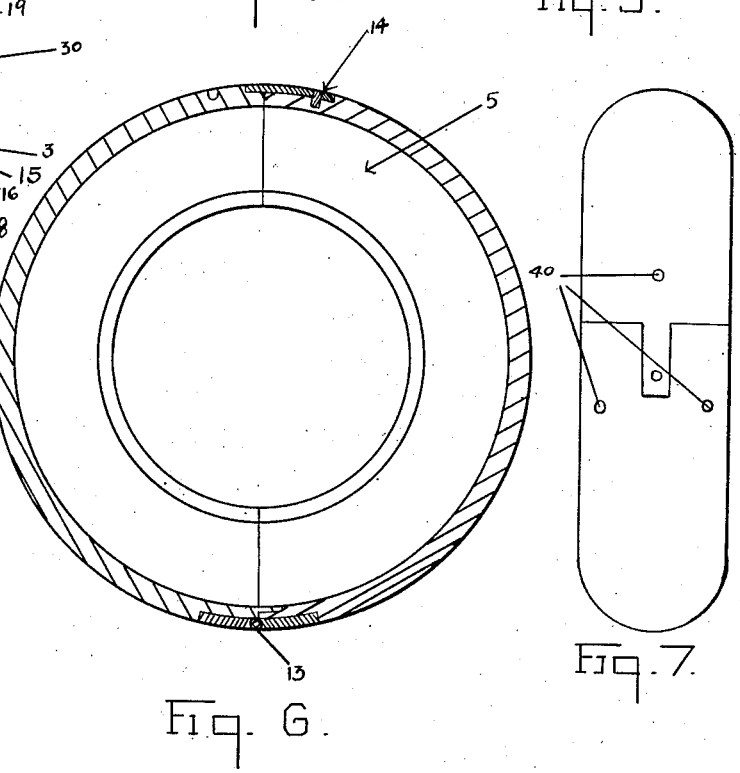
Fig. 6 represents a side elevation of the matrix.
Fig. 7 represents an end view of the matrix.

The section 18 comprises a flat body portion 20 having on one edge an outwardly extending flange 21 and on its other edge an inwardly extending flange 22. On the flange 22 at spaced points, are apertured ears 23 which facilitate the attachment of a contracting tool, not shown, which tool is employed to contract the split section in order that it may be inserted in the tire casing. The split ring or section 19 comprises an annular body 24 wider than the body 20 and provided on one edge with an outwardly extending annular flange 25 corresponding to the flange 21. An inwardly extending flange 26 corresponding to the one 22 is provided at a point intermediate of the edges of the body and is adapted to be engaged by the flange 22. On this flange 26 are apertured ears 27 for the same purpose as the ears 23. When these ring sections are assembled in the tire, the body 20 lies against the inner side of the body 24 with one edge of the body 24 engaging the flange 21, thus providing a rim-like holder which properly supports the air bag and in which the rim-like flanges engage the inner sides of the tire casing and hold the tire casing in the proper position as shown in Fig. 3. The two inwardly extending flanges 22 and 26 project through the opening on the inner side of the tire casing and into the circular space centrally of the vulcanizing chamber in order that they may be clamped and held in position.

As a means for holding the two sections 1 and 2 together I provide a plurality of lag bolts 27 hinged as at 28 on the stationary section 1 and adapted to be engaged in bifurcated ears 29 on the perimeter of the hinged section 2. Thumb screws 30 are mounted on said bolts so as to clamp the two sections together. In addition to this means there are provided resilient, bowed clamping bars 30' which are hinged at certain ends as at 31 to the inner perimeter of the stationary section 1 and have apertured ears at their free ends, which ears are adapted to engage in the bifurcated apertured ears 33 on the inner perimeter of the hinged section 2. When the apertures of these ears are in alignment, pins 34 are inserted therethrough to hold the clamping bars 30' in place. The clamping bars 30' are provided with screw threaded openings 35 between the ends thereof, in which openings screws 36 are mounted so as to extend at right angles to the clamping bars. The outer ends of these screws have hand wheels 37 to facilitate the adjustment of the screws. The inner ends of the screws are swivelly connected with bifurcated clamps 38 which receive in the bifurcations thereof, the flanges 22 and 26 of the air bag support. By tightening these clamps the proper pressure is exerted on the air bag holder to insure the proper presentation and holding of the tire casing in position to be effectively vulcanized.

With the machine of my invention it is unnecessary to employ the bead rings which are usually required in vulcanizing machines. Bead rings are usually of heavy iron and frequently become so hot as to burn or damage the beads. I eliminate this objection by providing the special air bag holder which fits inside of the casing and not only provides for the highly desirable use of an air bag instead of a sand or water bag to hold the tire casing distended, but which itself engages the inner sides of the bead portions of the tire casing in such manner as to hold these portions in proper position with relation to the matrix and vulcanizing chamber (see Fig. 1). This special form of air bag support and casing holder is made particularly effective by the simple and easily operated clamping members 30'. These clamping members 30' are likewise subject to an easy and effective operation to hold the sections of the vulcanizing chamber in proper relation. By having the steam jacket extend at right angles to the tread portion and across the tread only instead of along the side of the tire casing, the curing heat is applied at the point where it is needed and at no other point on the casing. This heat is evenly applied throughout the entire casing and curing of the rubber in retreading the casing is therefore effected in one operation.

The matrix is provided with sockets shown at 40, adjacent the detachable ends thereof to provide for attachment to the matrix of a suitable contracting tool, not shown, which may be used in instances where pressure is required to clamp the ends of the matrix together when the tire is contained in the matrix.

One of the features of advantage of my invention is the provision for quick and easy assembling and locking of the vulcanizing sections of the machine together, it being possible to disassemble said sections with equal ease and facility.

I claim:

1. A retreading mold comprising a vulcanizing chamber made up of two annular sections which are hinged together on one side and adapted to be moved into and out of engagement with one another, said sections being shaped to provide when together an annular vulcanizing chamber which is substantially circular in cross section, one of said sections only having a circumferential steam passage therein and the other of said sections being adapted to telescope in part within the first named section and means for clamping the sections together.

2. A retreading mold comprising an annular vulcanizing chamber which is substantially circular in cross section, a matrix within the chamber adapted to receive a tire to be vulcanized, an air bag adapted to be placed within the tire to hold the same distended within the matrix and an annular air bag holding member adapted to be mounted within the tire and comprising two split annular sections engaged with one another to form a rim for the bag, which split sections engage the inner sides of the tire casing and hold the casing distended adjacent the bead portions and means for securing the air bag holding member in position within the tire.

3. A retreading mold comprising an annular vulcanizing chamber which is substantially circular in cross section, a matrix within the chamber adapted to receive a tire to be vulcanized, an air bag adapted to be placed within the tire to hold the same distended within the matrix and an annular air bag holding member adapted to be mounted within the tire and comprising two split annular sections engaged with one another to form a rim for the bag, which split sections engage the inner sides of the tire casing and hold the casing distended adjacent the bead portions, means for securing the air bag holding member in position within the tire, which means includes bars extending transversely of the vulcanizing chamber on the inner perimeter thereof, screws adjustably supported in the bars and clamp members on the screws adapted to engage said split sections of the air bag holding member.

4. A retreading mold comprising a sectional vulcanizing chamber comprising two annular sections hinged to one another and each shaped whereby when the said sections are placed one against the other there will be formed an annular vulcanizing chamber which is substantially circular in cross section, means for clamping said sections together, one of said sections having an annular steam passage therein, a steam boiler disposed beneath said sections and in communication with said passage, a burner for said steam boiler, a sectional matrix comprising semi-annular portions which are substantially circular in cross section and hinged together at certain ends which is adapted to be received in said chamber and in which matrix a tire to be vulcanized is placed, an air bag within said tire for holding the tire distended within the matrix and an air bag support contained within the tire and having a portion thereof projecting out of the tire, clamping members hinged on the inner perimeter of one of the annular vulcanizing sections, means for attaching said clamping members to the inner perimeter of the other vulcanizing section and clamping means on said last named clamping members for engaging the air bag support.

KARL K. A. THORSEN.